United States Patent [19]

Merchel

[11] Patent Number: 5,573,097
[45] Date of Patent: Nov. 12, 1996

[54] SHOPPING OR LUGGAGE CART WITH LOCK

[75] Inventor: Horst Merchel, Bietigheim-Bissingen, Germany

[73] Assignee: Vendoret Holding S.A., Luxemboug-Hesperange, Luxembourg

[21] Appl. No.: 308,089

[22] Filed: Sep. 16, 1994

[30] Foreign Application Priority Data

Sep. 18, 1993 [DE] Germany ............... 43 31 753.7

[51] Int. Cl.⁶ .................................................. G07F 17/10
[52] U.S. Cl. .................................. 194/212; 194/905
[58] Field of Search ........................ 194/205, 212, 194/905

[56] References Cited

U.S. PATENT DOCUMENTS

| | | | |
|---|---|---|---|
| 3,809,202 | 5/1974 | Tyszkiewicz. | |
| 4,545,591 | 10/1985 | Balha. | |
| 4,637,507 | 1/1987 | Ricouard et al. | 194/905 X |
| 4,641,739 | 2/1987 | Marie | 194/905 X |
| 4,840,264 | 6/1989 | Chappoux et al. | 194/905 X |
| 5,235,833 | 8/1993 | Pinto. | |
| 5,377,806 | 1/1995 | Merchel | 194/212 |

FOREIGN PATENT DOCUMENTS

| | | |
|---|---|---|
| 0125127A3 | 11/1984 | European Pat. Off.. |
| 2333687 | 7/1977 | France. |
| 3436610A1 | 4/1985 | Germany. |
| 4227343A1 | 2/1993 | Germany. |

Primary Examiner—F. J. Bartuska
Attorney, Agent, or Firm—Herbert Dubno

[57] ABSTRACT

A lock used in combination with a shopping- or luggage cart and a stationary anchor element has a housing fixed on the cart, a retaining member movable on the housing between a locked position engaging around the anchor element and securing the cart thereto and an unlocked position disengaged from the anchor element, a first actuating mechanism in the housing connected to the retaining member for displacing it between its positions on actuation of the first mechanism by a card, coin, or token, a key, and a second actuating mechanism in the housing connected to the retaining member for displacing it between its positions on actuation of the first mechanism by the key.

4 Claims, 1 Drawing Sheet

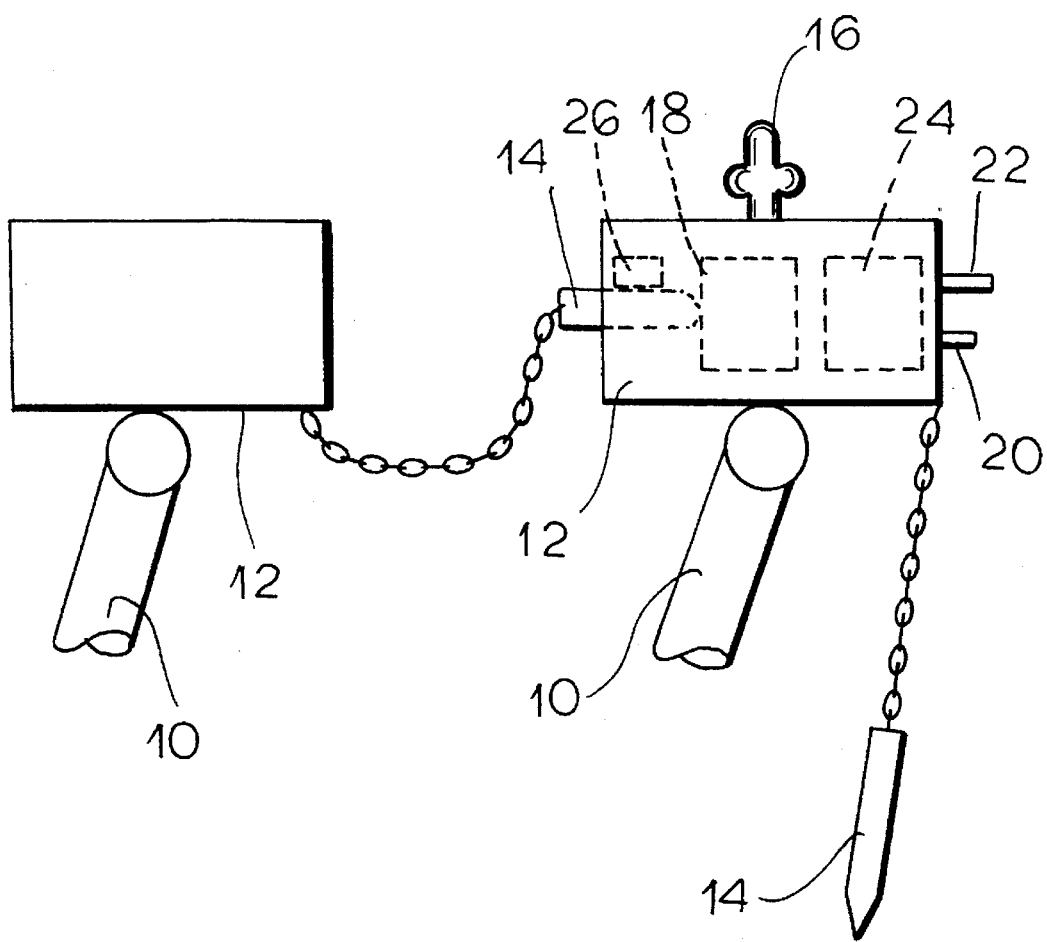

SHOPPING OR LUGGAGE CART WITH LOCK

FIELD OF THE INVENTION

The present invention relates to a shopping or luggage cart. More particularly this invention concerns such a cart having a lock by means of which the cart can be coupled to an adjacent trolley or an anchor element with the lock preventing the cart from being released until the lock is opened.

BACKGROUND OF THE INVENTION

Shopping-cart coupling locks are opened by a pledge in the form of a coin or token, so that one cart can be uncoupled from another. The coin or token remains held in the lock until the cart is again coupled to another cart or location. Frequently the shopper does not always have a coin handy, and the search for a coin before he or she can use a shopping cart leads to annoyance.

As described in my copending applications Ser. Nos. 08/254,293 and 08/258,977 respectively filed 6 Jun. 1994 and 10 Jun. 1994 as well as in my numerous earlier patents and patent applications cited therein, such a lock (as specifically detailed in my U.S. Pat. No. 5,377,806 issued 3 Jan. 1995 has a housing formed with an outwardly open latch port and an actuating port, a latch member adapted to be inserted into the latch port, an actuator—normally either a card, token, or coin—adapted to be inserted into the actuating port, and a latch element movable between a holding position retaining the latch member against removal from the latch port and a freeing position permitting such removal. A control element is movable on insertion of the actuator into the actuating port from a locked to an unlocked position, and interengageable formations on the elements displace the latch element into the freeing position on displacement of the control element by the actuator into the unlocked position.

Thus with this system the token, coin, or card used as actuator directly engages the control element and directly actuates the lock to release the latch member. Thus the user need merely poke his coin, token, or card into the actuating port to free the latch member and make use of the cart carrying the lock.

Even such a system can be a problem for someone who is not carrying the requisite coin, token, or card. What is more such a system does nothing to encourage customer loyalty by giving regular customers an advantage.

OBJECTS OF THE INVENTION

It is therefore an object of the present invention to provide an improved shopping- or luggage-cart lock.

Another object is the provision of such an improved shopping- or luggage-cart lock which overcomes the above-given disadvantages, that is which does not require a card, token, or coin and that also is set up to reward a regular customer or user.

SUMMARY OF THE INVENTION

A lock used in combination with a shopping- or luggage cart and a stationary anchor element has according to the invention a housing fixed on the cart, a retaining member movable on the housing between a locked position engaging around the anchor element and securing the cart thereto and an unlocked position disengaged from the anchor element, a first actuating mechanism in the housing connected to the retaining member for displacing it between its positions on actuation of the first mechanism by a card, coin, or token, a key, and a second actuating mechanism in the housing connected to the retaining member for displacing it between its positions on actuation of the first mechanism by the key.

A coupling lock actuatable by a key is particularly simply and reliably constructed and operated, more particularly since familiar well-established parts can be used. Moreover, the shopper can become the permanent possessor of a key which fits all the shopping carts, so that he or she is in a privileged position and has a close connection with the location at which the shopping carts are stationed.

According to another feature of this invention the second actuating mechanism is a rotary mechanism which is rotated by the key. This second actuating mechanism includes a rotary key cylinder having a passage in which the key fits and tumblers engageable with the key.

To encourage customer loyalty the key fits and operates a plurality of other such locks associated with other such carts. Thus a key holder can use any of the carts associated with a particular business establishment.

BRIEF DESCRIPTION OF THE DRAWING

The above and other objects, features, and advantages will become more readily apparent from the following description, reference being made to the accompanying drawing whose sole FIGURE is a diagrammatic depiction of the system of this invention.

SPECIFIC DESCRIPTION

A conventional shopping or luggage cart 10 has four wheels (unillustrated) and a wire basket into which articles can be laid. Luggage carts also have a loading surface for pieces of luggage. The carts 10 can be telescoped in one another so that they do not require much space at any location.

In the telescoped state the carts 10 are coupled to one another. To this end each cart 10 has attached thereto a coupling lock 12 which rests and locks a coupling member 14 of the adjacent cart 10 which is inserted in the lock 12. A retaining member 26 in the lock 12 can engage this member 14 in the manner described in my above-cited U.S. Pat. No. 5,377,806. To cancel the locking, a key 16 is inserted into the lock and inward pressure on and/or rotation of the key 16 releases the coupling member 14 of the adjacent cart 10, so that it can be removed from the row. The key 16 remains unremovable and therefore held inserted in the lock 12 until the cart 10 is again coupled to, more particularly telescoped with, another cart 10 and the coupling member of the other cart 10 is inserted in the cart 10 lock. This results in a release of the retention of the key 16, so that the key 16 can be withdrawn from the lock.

The lock 12 can have a key-operated mechanism 18 with a cylindrical core with tumblers, in whose keyhole or passage the key 16 can be inserted and rotated, so that with a key 16 fitting the tumblers, the result of a rotation of the key 16 is that the coupling member 14 of the other cart 10 can be removed from the lock 12. The mechanism 18 is set up as described in my above-cited U.S. Pat. No. 5,377,806 so that once the member 14 is removed the key 16 cannot be retracted. More particularly as described in this patent the lock element 26 is movable between a holding position retaining the latch member 14 against removal from the latch port and a freeing position permitting such removal. A control element is movable on insertion of the actuator into the actuating port from a locked to an unlocked position, and interengageable formations on the elements displace the latch element 26 into the freeing position on displacement of the control element by the actuator into the unlocked position.

In another alternative in addition to the key 16, the lock can also be actuated by a coin 20 and/or a card 22, so that uncoupling can also be achieved by the coin 20 and/or card 22 via a separate unlocking mechanism 24.

The key 16 used by the shopper or traveller fits all the cart locks of a location, more particularly a shop or a railway station/airport, while it is also possible to determine that the key 16 belongs exclusively to a particular area of a location.

I claim:

1. In combination with a shopping- or luggage cart and an anchor element, a lock comprising:

a housing fixed on the cart;

a retaining member movable on the housing between a locked position engaging the anchor element and securing the cart thereto and an unlocked position disengaged from the anchor element;

a first actuating mechanism in the housing including means connected to the retaining member for displacing it between its positions on actuation of the first mechanism by a card, coin, or token;

a key; and a second actuating mechanism in the housing into which the key can be fitted and including means connected to the retaining member for displacing it between its positions on actuation of the second mechanism by the key when fitted in the second mechanism, and means connected to the retaining member for retaining the key in the second mechanism when the retaining member is in the unlocked position.

2. The shopping/luggage-cart lock defined in claim 1 wherein the second actuating mechanism is a rotary mechanism which operates by being rotated by the key.

3. The shopping/luggage-cart lock defined in claim 2 wherein the second actuating mechanism includes a rotary key cylinder having a passage in which the key fits and tumblers engageable with the key.

4. The shopping/luggage-cart lock defined in claim 1 wherein the key fits and operates a plurality of other such locks associated with other such carts.

* * * * *